(12) United States Patent
Wu et al.

(10) Patent No.: US 12,036,692 B1
(45) Date of Patent: Jul. 16, 2024

(54) GUIDE WHEEL COOLING LIQUID DELIVERY SYSTEM OF CHAIN SAW GUIDE PLATE

(71) Applicant: Hangzhou FangCheng tools manufacture Co., Ltd., Hangzhou (CN)

(72) Inventors: Jianxiang Wu, Hangzhou (CN); Jiacheng Wu, Hangzhou (CN)

(73) Assignee: Hangzhou FangCheng tools manufacture Co., Ltd., Hangzhou (CN)

( * ) Notice: Subject to any disclaimer, the term of this patent is extended or adjusted under 35 U.S.C. 154(b) by 0 days.

(21) Appl. No.: 18/595,468

(22) Filed: Mar. 5, 2024

(30) Foreign Application Priority Data

Aug. 7, 2023 (CN) .......................... 202310984745.5

(51) Int. Cl.
*B27B 17/02* (2006.01)
*B27B 17/12* (2006.01)

(52) U.S. Cl.
CPC .............. *B27B 17/02* (2013.01); *B27B 17/12* (2013.01)

(58) Field of Classification Search
None
See application file for complete search history.

(56) References Cited

U.S. PATENT DOCUMENTS

| 4,341,017 | A | | 7/1982 | Janczak | |
|---|---|---|---|---|---|
| 5,056,224 | A | * | 10/1991 | Seigneur | B27B 17/12 144/34.1 |
| 5,092,044 | A | | 3/1992 | Edgerton | |
| 5,669,140 | A | * | 9/1997 | Tsumura | B27B 17/12 30/383 |
| 6,643,933 | B2 | * | 11/2003 | Seigneur | B27B 17/025 144/34.6 |
| 11,554,431 | B1 | | 1/2023 | Wang | |
| 2022/0143860 | A1 | * | 5/2022 | Burmester | B27B 17/025 |

FOREIGN PATENT DOCUMENTS

| CN | 101502973 | A | | 8/2009 |
|---|---|---|---|---|
| CN | 217669875 | U | | 10/2022 |
| CN | 220638260 | U | * | 3/2024 |
| DE | 102015002719 | A1 | | 9/2016 |
| JP | 2013255999 | A | | 12/2013 |

OTHER PUBLICATIONS

English translation of CN-220638260-U, Mar. 22, 2024.*

* cited by examiner

*Primary Examiner* — Hwei-Siu C Payer
(74) *Attorney, Agent, or Firm* — Bayramoglu Law Offices LLC

(57) ABSTRACT

A guide wheel cooling liquid delivery system of chain saw guide plate is provided. The guide wheel cooling liquid delivery system of chain saw guide plate includes at least a liquid inlet channel provided at the rear part of the chain saw guide plate, the liquid inlet channel is connected to the liquid inlet hole, the front part of the chain saw guide plate is provided with an anti-blocking liquid outlet structure, the anti-blocking liquid outlet structure is close to the middle of the guide wheel installation area, and the liquid inlet channel is connected to the anti-blocking liquid outlet structure through at least a liquid guide channel.

10 Claims, 3 Drawing Sheets

GUIDE WHEEL COOLING LIQUID DELIVERY SYSTEM OF CHAIN SAW GUIDE PLATE

CROSS REFERENCE TO THE RELATED APPLICATIONS

This application is based upon and claims priority to Chinese Patent Application No. 202310984745.5, filed on Aug. 7, 2023, the entire contents of which are incorporated herein by reference.

TECHNICAL FIELD

The present invention belongs to the field of chain saws, and particularly relates to a guide wheel cooling liquid delivery system of chain saw guide plate.

BACKGROUND

A chain saw, also called a gasoline saw, is a portable saw powered by a gasoline engine, which is mainly used for logging and lumber building, and its working principle is to perform shearing actions by relying on the transverse movement of the staggered L-shaped blades on the saw chain. Chain saws are generally divided into motorized chain saws, non-motorized chain saws, etc. During the working process, due to constant cutting friction, a large amount of heat will be generated, and then a certain cooling structure needs to be provided to increase the service life of the machine.

The patent with publication number CN217669875U discloses a chain saw guide plate of small handheld saw, which comprises a guide plate body formed by two outer guide plates clamping an inner guide plate, and the front and rear ends of the guide plate body are respectively an installation part and a cutting part; the installation part is provided with an installation opening, the installation opening comprises an open slot axially arranged along the center line of the guide plate body and an arc-shaped notch located at the rear end of the installation part, the open slot and the arc-shaped notch are connected to each other, the opening of the open slot is located in the middle of the arc-shaped notch, and there is a installation hole on both sides of the open slot.

The above-mentioned prior art does not have a guide wheel cooling system and cannot cool the guide wheel, and when used for a long time, it is easy to generate high temperature and affect the service life of the product.

SUMMARY

Accordingly, the present invention has been keeping in mind the above problems occurring in the prior art, and the object of the present invention is to provide a guide wheel cooling liquid delivery system of chain saw guide plate that can stably output cooling liquid to the guide wheel to lubricate and cool the chain saw guide plate.

The guide wheel cooling liquid delivery system of chain saw guide plate of the invention comprising at least a liquid inlet channel provided at the rear part of a chain saw guide plate, and said liquid inlet channel is connected to a liquid inlet hole, wherein the front part of the said chain saw guide plate is provided with an anti-blocking liquid outlet structure, and the liquid outlet of said anti-blocking liquid outlet structure is close to the middle of a guide wheel installation area, the liquid inlet channel is connected to said anti-blocking liquid outlet structure through at least a liquid guide channel; said anti-blocking liquid outlet structure comprises a liquid outlet groove provided on the inner surface of an outer plate, the inner end of said liquid outlet groove is connected to the liquid guide channel, and the outer end of said liquid outlet groove is close to the middle of said guide wheel installation area.

A guide wheel installation area is provided on the front part of the chain saw guide plate, the cooling liquid is input from the liquid inlet hole, flows through the liquid inlet channel and the liquid guide channel, and is output from the anti-blocking liquid outlet structure to the guide wheel installation area to lubricate and cool the bearings so as to improve their service life, and the anti-blocking outlet structure can prevent wood chips and other debris from blocking the liquid outlet, ensuring smooth output of cooling liquid. The liquid outlet groove is disposed on the inner surface of the outer plate and is not exposed on the outer plate, which avoids blocking caused by debris such as wood chips. The two ends of the liquid outlet groove are connected to the liquid guide channel and the guide wheel installation area respectively, and the cooling liquid is output from the liquid outlet groove to the guide wheel installation area through the liquid guide channel to lubricate and cool the bearings.

Preferably, the inner end of the liquid outlet groove is connected to the liquid guide channel through a liquid collecting hole provided in the inner plate.

Preferably, the length of the liquid outlet groove is 25-30 mm, the width is 1-5 mm, and the depth is 0.2-0.6 mm.

Preferably, the diameter of the liquid collecting hole is 5 mm-15 mm.

Preferably, the liquid collecting hole is disposed in front of the positioning hole, and the length from the center of the positioning hole to the center of the positioning hole is 12-20 mm.

The liquid collecting hole is in front of the positioning hole, and the liquid outlet groove is on the other side of the positioning hole, giving way to the positioning hole.

Preferably, the liquid collecting hole is connected to the liquid guide channel through at least two collecting grooves, the collecting grooves is provided on one or both side surfaces of the inner plate.

The collecting groove connects the liquid guide channel and the liquid collecting hole, bypassing the positioning hole, and a plurality of collecting grooves are provided to improve the delivery efficiency.

Preferably, the liquid collecting hole is disposed in front of a positioning hole, and the collecting grooves surround the positioning hole.

The collecting groove is located around the positioning hole, so as to bypass the positioning hole.

Preferably, there are two liquid inlet channels and they are respectively arranged at the upper part and lower part of the inner plate, and a liquid leakage preventing structure is provided between the two liquid inlet channels and the liquid guide channel to prevent outflow from the other liquid inlet channel when one of the liquid inlet channels is injected with liquid.

There are two liquid inlet channels, and the cooling liquid can be input from different directions as needed. The anti-leakage structure ensures that at most one liquid inlet channel is connected with the liquid guide channel, preventing the cooling liquid flowing out from another liquid inlet channel after being input from one liquid inlet channel, ensuring that the cooling liquid is smoothly input from the liquid inlet channel to the liquid guide channel.

Preferably, the liquid leakage preventing structure comprises a switching cavity provided between the two liquid inlet channels and the liquid guide channel, and a gravity blocking body that can prevent outflow from the other liquid inlet channel when one of the liquid inlet channels is supplied with liquid.

A gravity blocking body is provided in the switching cavity, which can move freely in the switching cavity through the action of gravity. When the gravity blocking body is located between the liquid inlet channel and the liquid guide channel, it can block the connection between the channels to ensure that only one liquid inlet channel is connected with the liquid guide channel.

Preferably, the width of the switching cavity is larger than the width of the liquid inlet channel and the liquid guide channel respectively, and the width of the gravity blocking body is adapted to the width of the switching cavity.

The width size of the gravity blocking body is adapted to the switching cavity, ensuring its free sliding in the switching cavity and achieving a good blocking effect. The width of the switching cavity is greater than the outlet of the liquid inlet channel and the inlet of the liquid guide channel, that is, the width of the gravity blocking body is greater than the outlet of the liquid inlet channel and the inlet of the liquid guide channel, so that the gravity blocking body will not enter the liquid inlet channel or the liquid guide channel, and is limited to the switching cavity.

Preferably, the two liquid inlet channels are separately located on two side surfaces of the inner plate.

The inner plate is designed with a front side and a rear side, and the liquid inlet channels are located on the two sides of the inner plate, ensuring that cooling liquid can be input from both sides, making it more convenient to use and have higher structural strength.

Preferably, the liquid guide channel runs through both sides of the inner plate.

The liquid guide channel is in the form of a through-groove to ensure the delivery flow of liquid.

Preferably, there are two liquid guide channels, and the rear ends thereof are arranged in one-to-one correspondence with the liquid inlet channels.

As a parallel solution to providing a liquid guide channel on one side of the anti-leakage structure, two liquid guide channels are provided, and the rear ends thereof are connected to the switching cavity.

Preferably, there are two liquid guide channels and two liquid inlet channels, the liquid guide channels and the liquid inlet channels are arranged in one-to-one correspondence, and the liquid guide channels and the liquid inlet channels are arranged on the side surface of the inner plate.

As a parallel solution to providing a liquid guide channel, two liquid guide channels are provided, and two liquid inlet channels are provided and correspondingly connected to the liquid guide channels, adding options for different cooling liquid input directions, and there is no problem that the liquid is input into one liquid inlet channel and then flows out from the other one. The liquid guide channel and the liquid inlet channel are arranged on the side surfaces of the inner plate, and the channels are formed by the clamping of the outer plates.

Compared with the prior art, the present invention has the following advantages:

1. The guide wheel cooling liquid delivery system of chain saw guide plate of the present invention is provided with two liquid inlet channels, which can input cooling liquid from two positions and directions to meet the input of cooling liquid under different service conditions;
2. An anti-leakage structure is provided between the two liquid inlet channels and one liquid inlet channel to prevent the cooling liquid from flowing out of the other liquid inlet channel after being input from one liquid inlet channel;
3. When a single liquid guide channel is provided, it is in the form of a through-groove, which ensures the delivery flow of liquid;
4. The anti-blocking outlet structure prevents the liquid outlet from being blocked by debris such as wood chips, ensuring smooth and stable output of cooling liquid;
5. The liquid inlet channel, liquid outlet groove, collecting groove, and liquid guide channels in the design solution comprising a plurality of liquid guide channels are all arranged in the form of grooves to ensure structural strength.

Figure 1:
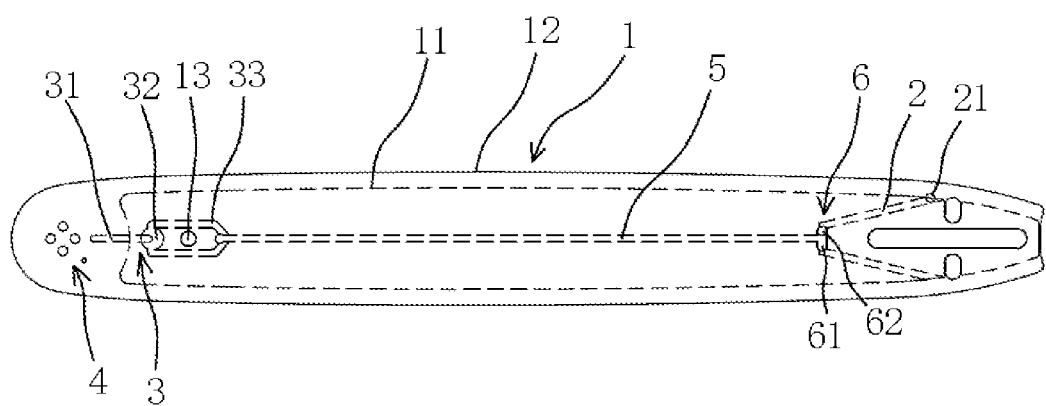
FIG. 1 is a schematic diagram of the overall structure of embodiment 1 of the present invention.

Legend in the figures, chain saw guide plate 1, inner plate 11, outer plate 12, positioning hole 13, liquid inlet channel 2, liquid inlet hole 21, anti-blocking liquid outlet structure 3, liquid outlet groove 31, liquid collecting hole 32, collecting groove 33, guide wheel installation area 4, liquid guide channel 5, anti-leakage structure 6, switching cavity 61, gravity blocking body 62.

DETAILED DESCRIPTION OF THE EMBODIMENTS

The present invention will be more clearly understood from the following detailed description taken in conjunction with the accompanying drawings. Obviously, the embodiments described are only parts of embodiments of the present invention. Although the preferred embodiment of the present invention has been disclosed for illustrative purposes, those skilled in the art will appreciate that all other embodiments based on the embodiments of the present invention without paying creative work fall within the basic teaching herein set forth, without departing from the scope and spirit of the invention as disclosed in the accompanying claims.

Embodiment 1

Figure 2:
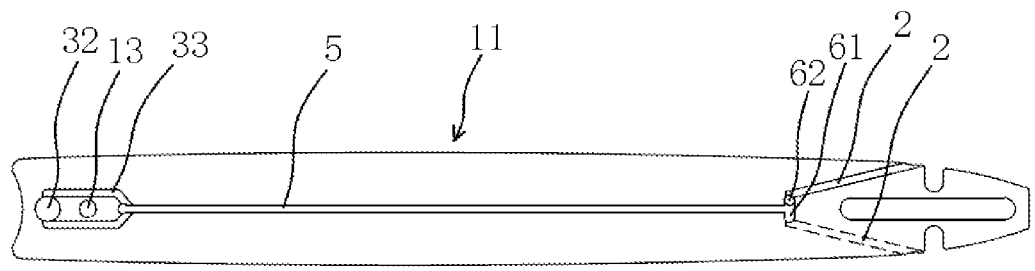
FIG. 2 is a schematic diagram of the inner plate structure of embodiment 1 of the present invention.
Figure 3:
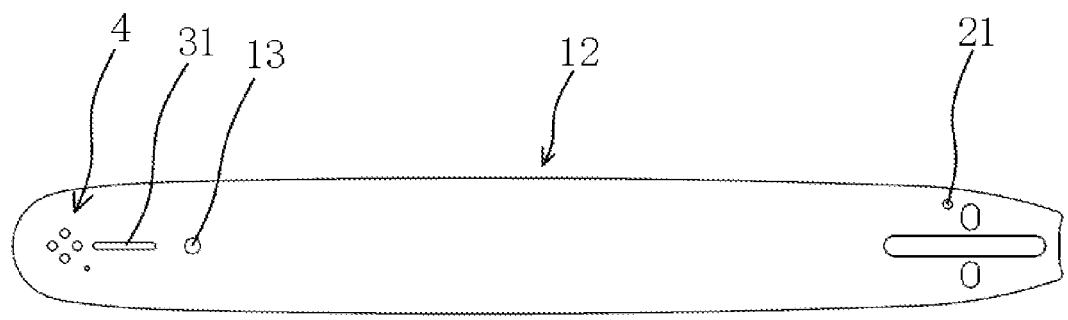
FIG. 3 is a schematic diagram of the outer plate structure of embodiment 1 of the present invention.

In a specific embodiment, as shown in FIG. 1 to FIG. 3 (the dotted line part in the figures indicates the back or internal structure, which is not visible from the current view direction), the guide wheel cooling liquid delivery system of chain saw guide plate comprises two liquid inlet channels 2 provided at the rear part of the chain saw guide plate 1, the liquid inlet channels 2 are connected to the liquid inlet hole

21, the front part of the chain saw guide plate 1 is provided with an anti-blocking liquid outlet structure 3, the anti-blocking liquid outlet structure 3 is close to the middle of the guide wheel installation area 4, and the liquid inlet channels 2 are connected to the anti-blocking liquid outlet structure 3 through at least a liquid guide channel 5.

Specifically, the chain saw guide plate 1 is formed by two outer plates 12 sandwiching an inner plate 11, a guide wheel installation area 4 is provided on the front part of the chain saw guide plate 1, the cooling liquid is input from the liquid inlet hole 21, flows through the liquid inlet channel 2 and the liquid guide channel 5, and is output from the anti-blocking liquid outlet structure 3 to the guide wheel installation area 4 to lubricate and cool the bearings so as to improve their service life, and the anti-blocking outlet structure 3 can prevent wood chips and other debris from blocking the liquid outlet, ensuring smooth output of cooling liquid.

As shown in FIG. 1 and FIG. 3, the anti-blocking liquid outlet structure 3 comprises a liquid outlet groove 31 disposed on the inner surface of the outer plate 12; the inner end of the liquid outlet groove 31 is connected to the liquid guide channel 5, and the outer end of the liquid outlet groove 31 is close to the middle of the guide wheel installation area 4. The inner end of the liquid outlet groove 31 is connected to the liquid guide channel 5 through a liquid collecting hole 32 provided in the inner plate 11.

Specifically, the liquid outlet groove 31 is disposed on the inner surface of the outer plate 12 and is not exposed on the outer plate 12, which avoids blocking caused by debris such as wood chips. The two ends of the liquid outlet groove 31 are connected to the liquid guide channel 5 and the guide wheel installation area 4 respectively, and the cooling liquid is output from the liquid outlet groove 31 to the guide wheel installation area 4 through the liquid guide channel 5 to lubricate and cool the bearings. The inner end of the liquid outlet groove 31 is located in the end of the liquid collecting hole 32, and the liquid guide channel 5 is connected with the liquid collecting hole 32. The cooling liquid flows from the liquid guide channel 5 to the liquid collecting hole 32, and then is output from the liquid outlet groove 31.

Preferably, the length of the liquid outlet groove 31 is 27.3 mm, the width is 3 mm, the depth is 0.3-0.5 mm, and the diameter of the liquid collecting hole 32 is 10 mm.

Preferably, the liquid collecting hole 32 is disposed in front of the positioning hole 13.

As shown in FIG. 2, the liquid collecting hole 32 is connected to the liquid guide channel 5 through two collecting grooves 33, the collecting grooves 33 are provided on one or two side surfaces of the inner plate 11. The liquid collecting hole 32 is disposed in front of a positioning hole 13, and the collecting grooves 33 surround the positioning hole 13.

Specifically, the collecting groove 33 connects the liquid guide channel 5 and the liquid collecting hole 32, is located around the positioning hole 13, and bypasses the positioning hole 13, and a plurality of collecting grooves 33 are provided to improve the delivery efficiency.

As shown in FIG. 2, there are two liquid inlet channels 2 and they are respectively arranged at the upper part and lower part of the inner plate 11, and a liquid leakage preventing structure 6 is provided between the two liquid inlet channels 2 and the liquid guide channel 5 to prevent outflow from the other liquid inlet channel 2 when one of the liquid inlet channels 2 is injected with liquid. The liquid leakage preventing structure 6 comprises a switching cavity 61 provided between the two liquid inlet channels 2 and the liquid guide channel 5, and a gravity blocking body 62 that can prevent outflow from the other liquid inlet channel 2 when one of the liquid inlet channels 2 is supplied with liquid.

Specifically, two liquid inlet channels 2 are provided, and they can both be arranged on the same side of the inner plate 11, or they can be arranged separately on two sides. In this embodiment, two liquid inlet channels 2 are arranged separately on two sides of the inner plate 11, and the two ends of the liquid inlet channel are respectively connected to the liquid inlet hole 21 and the switching cavity 61 of the anti-leakage structure 6, so that the cooling liquid can be input from different directions as needed. The anti-leakage structure 6 ensures that at most one liquid inlet channel 2 is connected with the liquid guide channel 5, preventing the cooling liquid flowing out from another liquid inlet channel 2 after being input from one liquid inlet channel 2, ensuring that the cooling liquid is smoothly input from the liquid inlet channel 2 to the liquid guide channel 5. A gravity blocking body 62 is provided in the switching cavity 61, which can move freely in the switching cavity 61 through the action of gravity. When the gravity blocking body 62 is located between the liquid inlet channel 2 and the liquid guide channel 5, it can block the connection between the channels to ensure that only one liquid inlet channel 2 is connected with the liquid guide channel 5.

Preferably, the width of the switching cavity 61 is larger than the width of the liquid inlet channel 2 and the liquid guide channel 5 respectively, and the width of the gravity blocking body 62 is adapted to the width of the switching cavity 61.

In other words, the width size of the gravity blocking body 62 is adapted to the switching cavity 61, ensuring its free sliding in the switching cavity 61 and achieving a good blocking effect. The width of the switching cavity 61 is greater than the outlet of the liquid inlet channel 2 and the inlet of the liquid guide channel 5, that is, the width of the gravity blocking body 62 is greater than the outlet of the liquid inlet channel 2 and the inlet of the liquid guide channel 5, so that the gravity blocking body 62 will not enter the liquid inlet channel 2 or the liquid guide channel 5, and is limited to the switching cavity 61.

Preferably, the two liquid inlet channels 2 are separately located on both side surfaces of the inner plate 11.

In other words, the inner plate 11 is designed with a front side and a rear side, and the liquid inlet channels 2 are located on the two sides of the inner plate 11, ensuring that cooling liquid can be input from both side, making it more convenient to use and have higher structural strength.

Preferably, the liquid guide channel runs through both sides of the inner plate 11, and the liquid guide channel is in the form of a through-groove to ensure the delivery flow of liquid.

Preferably, the liquid inlet channel 2, the liquid outlet groove 31, and the collecting groove 33 are arranged in the form of grooves, which ensures the structural strength while meeting the needs of cooling liquid delivery.

Specific working principle: The cooling liquid is input from the liquid inlet hole 21, flows through the liquid inlet channel 2 and flows into the switching cavity 61. At this time, the gravity blocking body 62 moves between another liquid inlet channel 2 and the liquid guide channel 5 due to the action of gravity and the thrust of cooling liquid, blocking the connection thereof. The cooling liquid flows from the switching cavity 61 to the liquid guide channel 5, and at the front end of the liquid guide channel 5, it flows through the collecting channel 33, bypasses the positioning hole 13, and flows into the liquid collecting hole 32, and finally the cooling liquid is output to the guide wheel installation area 4 through the liquid outlet groove 31 to lubricate and cool the bearings.

Embodiment 2

The operating principle of this embodiment is basically the same as that of Embodiment 1, except that two liquid guide channels 5 are provided in this embodiment.

Figure 4:
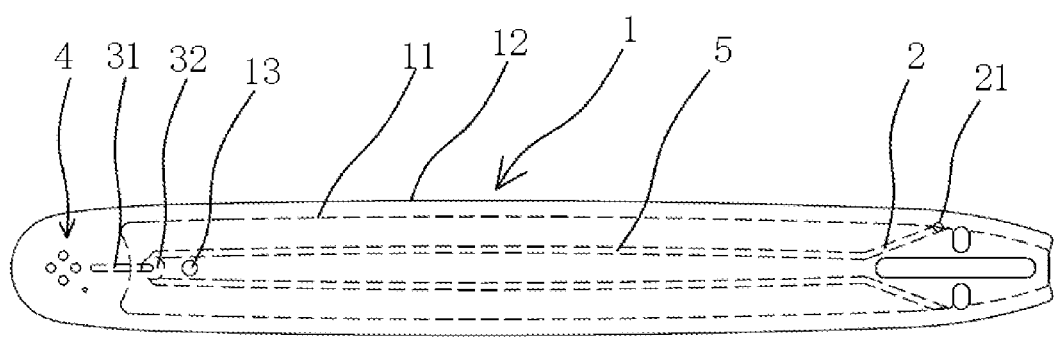
FIG. 4 is the schematic diagram of the overall structure of embodiment 2 of the present invention.
Figure 5:
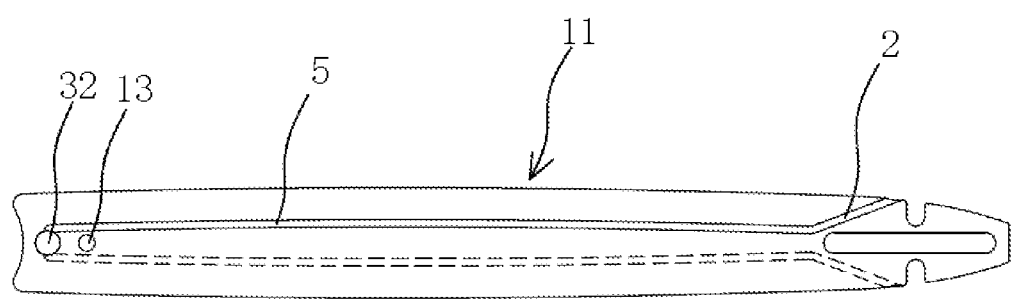
FIG. 5 is a schematic diagram of the inner plate structure of embodiment 2 of the present invention.

As shown in FIG. 4 and FIG. 5, there are two liquid guide channels 5 and two liquid inlet channels 2, the liquid guide channels 5 and the liquid inlet channels 2 are arranged in one-to-one correspondence, and the liquid guide channels 5 and the liquid inlet channels 2 are arranged on the side surface of the inner plate 11.

Specifically, two liquid guide channels 5 are provided in this embodiment, and two liquid inlet channels 2 are provided and correspondingly connected to the liquid guide channels 5, adding options for different cooling liquid input directions, and there is no problem that the liquid is input into one liquid inlet channel 2 and then flows out from the other one. The liquid guide channel 5 and the liquid inlet channel 2 are arranged on the side surfaces of the inner plate 12, and the channels are formed by the clamping of the outer plates. The front end of the liquid guide channel 5 is connected to the liquid collecting hole 32, and the cooling liquid flows together into the liquid collection hole 32.

Specific working principle: The cooling liquid is input from one liquid inlet hole 21, flows from the connected liquid inlet channel 2 through the liquid guide channel 5 to the liquid collecting hole 32, and then is output from the liquid outlet groove 31.

Embodiment 3

The operating principle of this embodiment is basically the same as that of Embodiment 1, except that this embodiment is provided with two liquid inlet channels 2, but no gravity blocking body is provided in the switching cavity 61.

Figure 6:
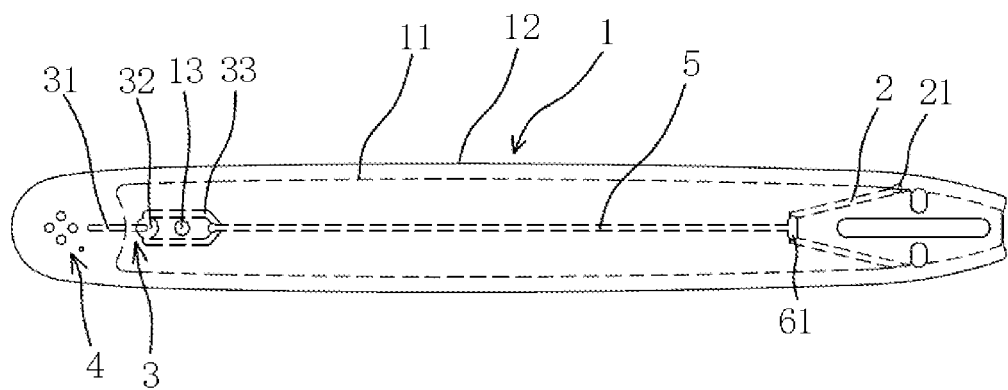
FIG. 6 is the schematic diagram of the overall structure of embodiment 3 of the present invention.
Figure 7:
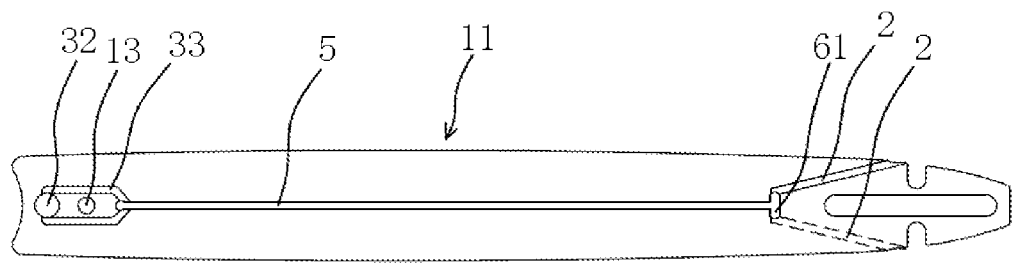
FIG. 7 is a schematic diagram of the inner plate structure of embodiment 3 of the present invention.

As shown in FIG. 6 and FIG. 7, two liquid inlet channels 2 are provided, which are respectively arranged separately on two side surfaces of the inner plate 11, to avoid the problem of easy penetration of the inner plate 11 when the two liquid inlet channels 2 are arranged at the same position on both sides, increase the maximum depth that can be set for the liquid inlet channel 2, and ensure structural strength. Of course, if the depth is small, the liquid inlet channels 2 can also be arranged on the same side of the inner plate 11, and the inner ends of the two liquid inlet channels 2 are connected to the two ends of the switching cavity 61 in a V shape, and the cooling liquid flows from the liquid inlet channel 2 to the switching cavity 61, and then flows to the liquid guide channel 5 to realize the input of the cooling liquid.

The above description of published embodiments enables the persons skilled in the art can realize or use the present invention. Various modifications of these embodiments are obvious to those skilled in the art. The general principle according to the present invention can be embodied in other examples without departing from the spirit and scope of the invention as defined by the appended claims. Hence, the present invention shall not be limited to the embodiments shown in the specification but to the widest range conforming to principles and novel features that are disclosed in this paper.

What is claimed is:

1. A guide wheel cooling liquid delivery system of a chain saw guide plate, comprising at least one liquid inlet channel provided at a rear part of the chain saw guide plate, and the at least one liquid inlet channel being connected to a liquid inlet hole, wherein a front part of the chain saw guide plate is provided with an anti-blocking liquid outlet structure, and a liquid outlet of the anti-blocking liquid outlet structure is close to a middle of a guide wheel installation area of an outer plate of the chain saw guide plate, the at least one liquid inlet channel is connected to the anti-blocking liquid outlet structure through at least one liquid guide channel; the anti-blocking liquid outlet structure comprises a liquid outlet groove provided on an inner surface of the outer plate, an inner end of the liquid outlet groove is connected to the at least one liquid guide channel, and an outer end of the liquid outlet groove is close to the middle of the guide wheel installation area; the at least one liquid inlet channel is two liquid inlet channels comprising a first liquid inlet channel and a second liquid inlet channel, the two liquid inlet channels are respectively arranged at an upper part and a lower part of an inner plate of the chain saw guide plate, and a liquid leakage preventing structure is provided between the two liquid inlet channels and the at least one liquid guide channel to prevent outflow from one of the liquid inlet channels when the other of the liquid inlet channels is injected with a liquid.

2. The guide wheel cooling liquid delivery system of the chain saw guide plate of claim 1, wherein the inner end of the liquid outlet groove is connected to the at least one liquid guide channel through a liquid collecting hole provided in the inner plate.

3. The guide wheel cooling liquid delivery system of the chain saw guide plate of claim 2, wherein the liquid collecting hole is connected to the at least one liquid guide channel through at least two collecting grooves, the at least two collecting grooves are provided on one or both side surfaces of the inner plate.

4. The guide wheel cooling liquid delivery system of the chain saw guide plate of claim 3, wherein the liquid collecting hole is disposed in front of a positioning hole, and the at least two collecting grooves surround the positioning hole.

5. The guide wheel cooling liquid delivery system of the chain saw guide plate of claim 1, wherein the liquid leakage preventing structure comprises a switching cavity provided between the two liquid inlet channels and the at least one liquid guide channel, and a gravity blocking body is provided in the switching cavity to prevent outflow from the one liquid inlet channel when the other liquid inlet channel is supplied with the liquid.

6. The guide wheel cooling liquid delivery system of the chain saw guide plate of claim 5, wherein a width of the switching cavity is larger than a width of each of the two liquid inlet channels and the at least one liquid guide channel respectively, and a width of the gravity blocking body is adapted to the width of the switching cavity.

7. The guide wheel cooling liquid delivery system of the chain saw guide plate of claim 5, wherein the two liquid inlet channels are located on both side surfaces of the inner plate respectively.

8. The guide wheel cooling liquid delivery system of the chain saw guide plate of claim 7, wherein the at least one liquid guide channel runs through both side surfaces of the inner plate.

9. The guide wheel cooling liquid delivery system of the chain saw guide plate of claim 1, wherein the at least one liquid guide channel is two liquid guide channels, the two liquid guide channels and the two liquid inlet channels are arranged in a one-to-one correspondence, and the two liquid guide channels and the two liquid inlet channels are arranged on a side surface of the inner plate.

10. The guide wheel cooling liquid delivery system of the chain saw guide plate of claim 2, wherein the at least one liquid guide channel is two liquid guide channels, the two liquid guide channels and the two liquid inlet channels are arranged in a one-to-one correspondence, and the two liquid guide channels and the two liquid inlet channels are arranged on a side surface of the inner plate.

\* \* \* \* \*